(12) United States Patent
Kluzner et al.

(10) Patent No.: US 6,945,222 B1
(45) Date of Patent: Sep. 20, 2005

(54) DETERMINING DEGRADATION OF AN IDLE AIR THROTTLING DEVICE

(75) Inventors: Michael Kluzner, Oak Park, MI (US); Margherita Zanini-Fisher, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 10/838,085

(22) Filed: May 3, 2004

(51) Int. Cl.[7] .............................................. F02D 41/00
(52) U.S. Cl. ............................. 123/339.15; 123/339.24
(58) Field of Search ....................... 123/339.15, 339.1, 123/339.12, 339.14, 339.24, 319, 395

(56) References Cited

U.S. PATENT DOCUMENTS

| | | | |
|---|---|---|---|
| 4,875,456 A | 10/1989 | Tomisawa | |
| 5,408,871 A | 4/1995 | Lieder et al. | |
| 5,857,163 A * | 1/1999 | Trombley et al. | 701/101 |
| 6,158,420 A | 12/2000 | Ohsaki et al. | |
| 6,848,418 B1 * | 2/2005 | Summers et al. | 123/339.11 |

* cited by examiner

*Primary Examiner*—Bibhu Mohanty
(74) *Attorney, Agent, or Firm*—Donald J. Lewis; Allan J. Lippa

(57) ABSTRACT

A method to determine degradation of an idle air throttling device in an internal combustion engine. Degradation is determined in a manner that may permit evaluation of both the idle air throttling device and expected engine operating conditions.

22 Claims, 6 Drawing Sheets

DETERMINING DEGRADATION OF AN IDLE AIR THROTTLING DEVICE

FIELD

The present disclosure relates to a method for determining degradation of an idle air throttling device and more particularly to a method for determining degradation of an idle air throttling device during warm-up of an internal combustion engine.

BACKGROUND

Air inducted into an engine during idle can be regulated in several different ways. For example, an auxiliary air throttling valve may be connected in parallel with a main throttling valve. When the main throttling valve is closed, the valve position of the auxiliary valve can be used to regulate the air amount inducted into an engine. In addition, an engine air amount may be regulated during idle via an electronic throttle. By using an electrical actuator to control valve position of a single throttle, the engine air amount during idle may be controlled. Furthermore, electromechanical intake valves can also regulate engine air amounts inducted during idle. By controlling the intake valve opening and closing positions (and/or lift amount), engine inducted air amounts may be controlled. The above illustrate various idle air amount throttling valves.

Because each of the above mentioned valves can be automatically controlled, i.e., controlled at least in part by an electromechanical control system, it can be beneficial to determine when degradation of the idle air regulating device may have occurred.

One method to determine degradation of an auxiliary idle air control valve is described in U.S. Pat. No. 4,875,456. This method presents a means to determine valve degradation of an auxiliary air control valve used to bypass a main throttle valve of an intake air system. The method compares an air amount detected in a main air intake passage to an air amount calculated from the valve position of an auxiliary air control valve while the main throttle is closed. If the air amount detected in the main air intake passage is greater than the air amount calculated from a valve position of the auxiliary valve by a predetermined amount, valve degradation is determined.

The above-mentioned method can have several disadvantages. For example, the approach determines valve degradation is present if a determined amount of air is inducted into an engine is greater than an air amount determined by valve position. In other words, if less air flows into an engine than desired, valve degradation is not determined. In addition, the method may not be beneficial in determining if an engine is warming up as desired. For example, during a cold start, engine idle speed can be elevated to reduce the time to warmed-up engine operation. If less air is flowing into an engine than desired, engine speed may be reduced, thereby increasing the amount of time to a warmed-up condition. This may increase engine emissions because emissions can be lower in a warmed-up engine.

Another method to determine degradation of an auxiliary idle air control valve is described in U.S. Pat. No. 5,408,871. This method presents another approach for determining valve degradation of an auxiliary air control valve used to bypass a main throttle valve of an intake air system. The approach appears to rely on an engine speed check and a spark check to enable the valve diagnostics. Further, the method appears not to enable the diagnostic until certain criteria are met, such as engine coolant temperature.

The above-mentioned method can also have several disadvantages. For example, if the diagnostic is not enabled until after the engine is warmed up, degraded valve performance that may occur during cold starting conditions may not be identified. This can lead to cold starting operation where less airflow is provided than desired, resulting in slower catalyst warm-up and therefore increased emissions.

The inventors herein have recognized the above-mentioned disadvantages and have developed a method of determining degradation of an idle air throttling valve that offers substantial improvements over prior methods.

SUMMARY

One embodiment of the present disclosure includes a method for determining degraded performance of an idle air amount throttling valve used to control an engine air amount inducted into an internal combustion engine, the method comprising: operating said idle air amount throttling valve to provide a inducted engine air amount; and determining degradation of said idle air amount throttling valve based on a comparison of said inducted engine air amount and a determined inducted engine air amount, said degradation determination performed at least when temperature is less than a threshold value.

Note that various temperatures can be used, such as, for example: engine coolant temperature, catalyst temperature, engine inducted air temperature, or combinations thereof.

This method can be used to reduce the above-mentioned limitations of the prior art approaches.

In other words, by performing a determination of idle air throttling valve degradation at least during a catalyst temperature warm-up condition, for example, it may be possible to detect degraded valve performance that affects catalyst warm-up and thus may increase emissions. In other words, valve degradation may be used as a factor to determine if idle air flow and engine warm-up are sufficient. Furthermore, an indication of valve degradation may be used to identify potential sources that may contribute to insufficient idle air flow and warm-up, namely, an idle air valve.

In another example, a method to reduce engine emissions after a cold start increases engine air flow, retard spark after top-dead-center (ATDC) of a combustion stroke, and operates with a lean air-fuel mixture during a predetermined interval that is based on catalyst operating conditions, thereby increasing catalyst temperature and efficiency. Determining idle air valve degradation during this interval may provide degradation information that is indicative of a desired idle air flow and a corresponding engine warm-up rate. For example, a specific degradation measurement may indicate less than a desired amount of air flow. This indication, along with other operating conditions, may be further used to determine an engine warm-up rate by modeling or inference. Thus, an indication of valve degradation, or a lack thereof, during the above-mentioned temperature conditions can be indicative of valve operation and engine warm-up.

In addition, the above-mentioned method can be used to determine if valve degradation results in less than or greater than a desired idle air amount. By doing so, the method can not only determine if idle air flow is close to a desired amount, but the method can also be part of a system that determines if an engine is warming up at less than or greater than a desired rate.

The above-mentioned method has the advantage of determining valve degradation during an interval that can be indicative of engine warm-up and emissions. The amount of degradation may then be used to determine if air flow and engine warm-up rate are sufficient. Furthermore, the method can assess valve degradation if engine idle air amounts are less than or greater than a desired amount.

BRIEF DESCRIPTION OF THE DRAWINGS

The advantages described herein will be more fully understood by reading an example of an embodiment in which the invention is used to advantage, referred to herein as the Description of Invention, with reference to the drawings, wherein.

DETAILED DESCRIPTION

Figure 1:
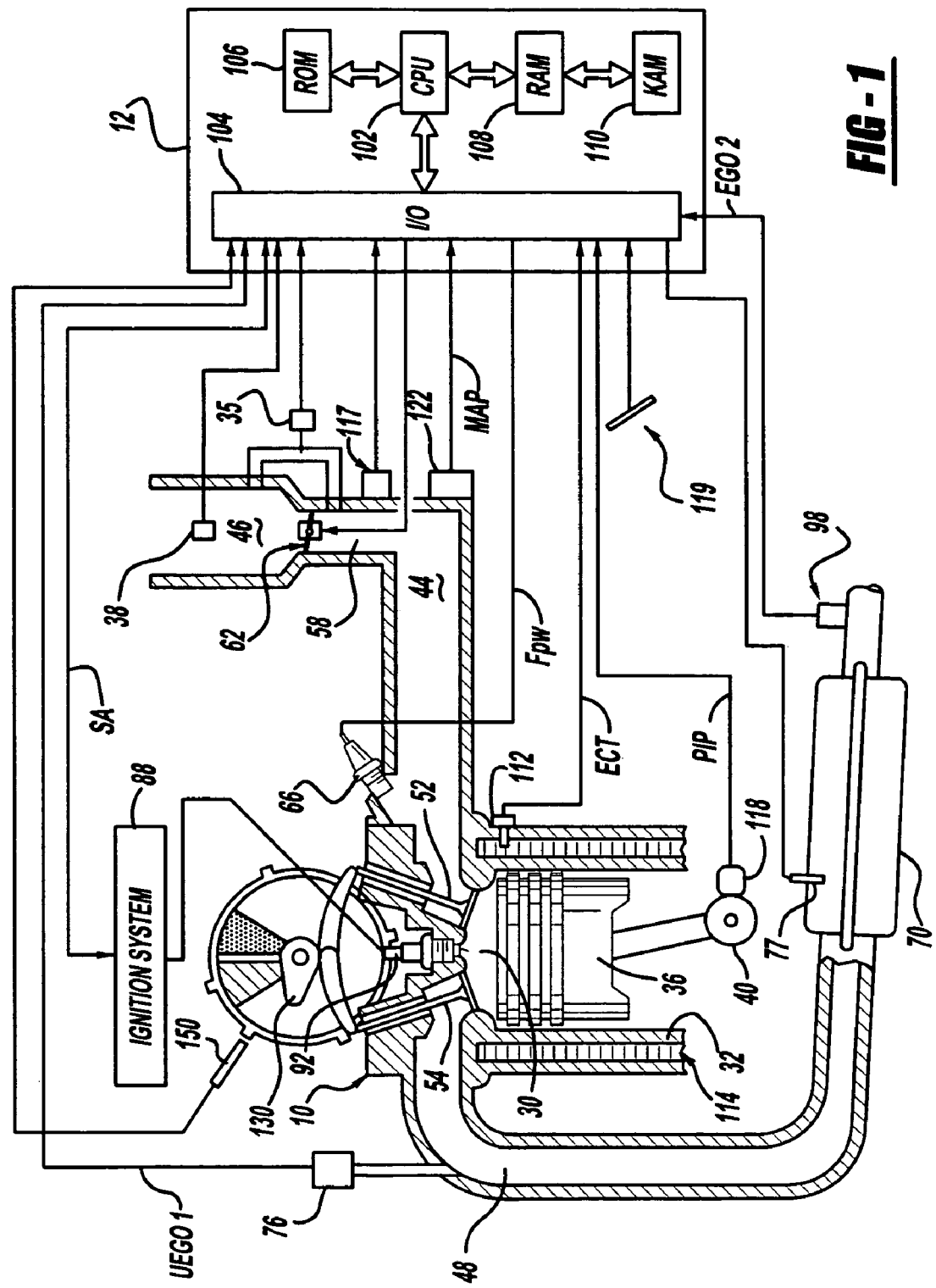
FIG. 1 is a schematic diagram of an engine wherein the invention is used to advantage.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with camshaft 130 and piston 36 positioned therein and connected to crankshaft 40. Combustion chamber 30 is known communicating with intake manifold 44 and exhaust manifold 48 via respective intake valve 52 an exhaust valve 54. Alternatively, mechanically driven valve 52 may be replaced by an electromechanically actuated valve (not shown) or electromechanically actuated valves may replace valves 52, 54, and camshaft 130.

Intake manifold 44 is shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. Intake manifold 44 is shown communicating with intake plenum 46 via throttle body 58 and throttle plate 62. Operator demand is communicated via a pedal and mechanical linkage (not shown) to throttle plate 62. Intake manifold 44 is also in communication with intake plenum 46 via auxiliary idle air throttling valve 35. Alternatively, an electronic throttle and pedal sensor 119 can be substituted for mechanical throttle 62 and auxiliary idle air valve 35. Air mass sensor 38 is in communication with throttle body 58 and is located along the length of intake plenum 46.

Distributorless ignition system 88 provides ignition spark to combustion chamber 30 via spark plug 92 in response to controller 12. Two-state exhaust gas oxygen sensor 76 is shown coupled to exhaust manifold 48 upstream of catalytic converter 70. Alternatively, a Universal Exhaust Gas Oxygen (UEGO) sensor may be substituted for two-state sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Controller 12 is shown in FIG. 1 as a conventional microcomputer including: microprocessor unit 102, input/output ports 104, and read-only memory 106, random access memory 108, Keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold absolute pressure (MAP) form pressure sensor 122 coupled to intake manifold 44; a measurement (ACT) of engine air amount temperature or manifold temperature from temperature sensor 117; a cam position signal (CAM) from cam sensor 150; and a profile ignition pickup signal (PIP) from a Hall effect sensor 118 coupled to a crankshaft 40.

Figure 2:
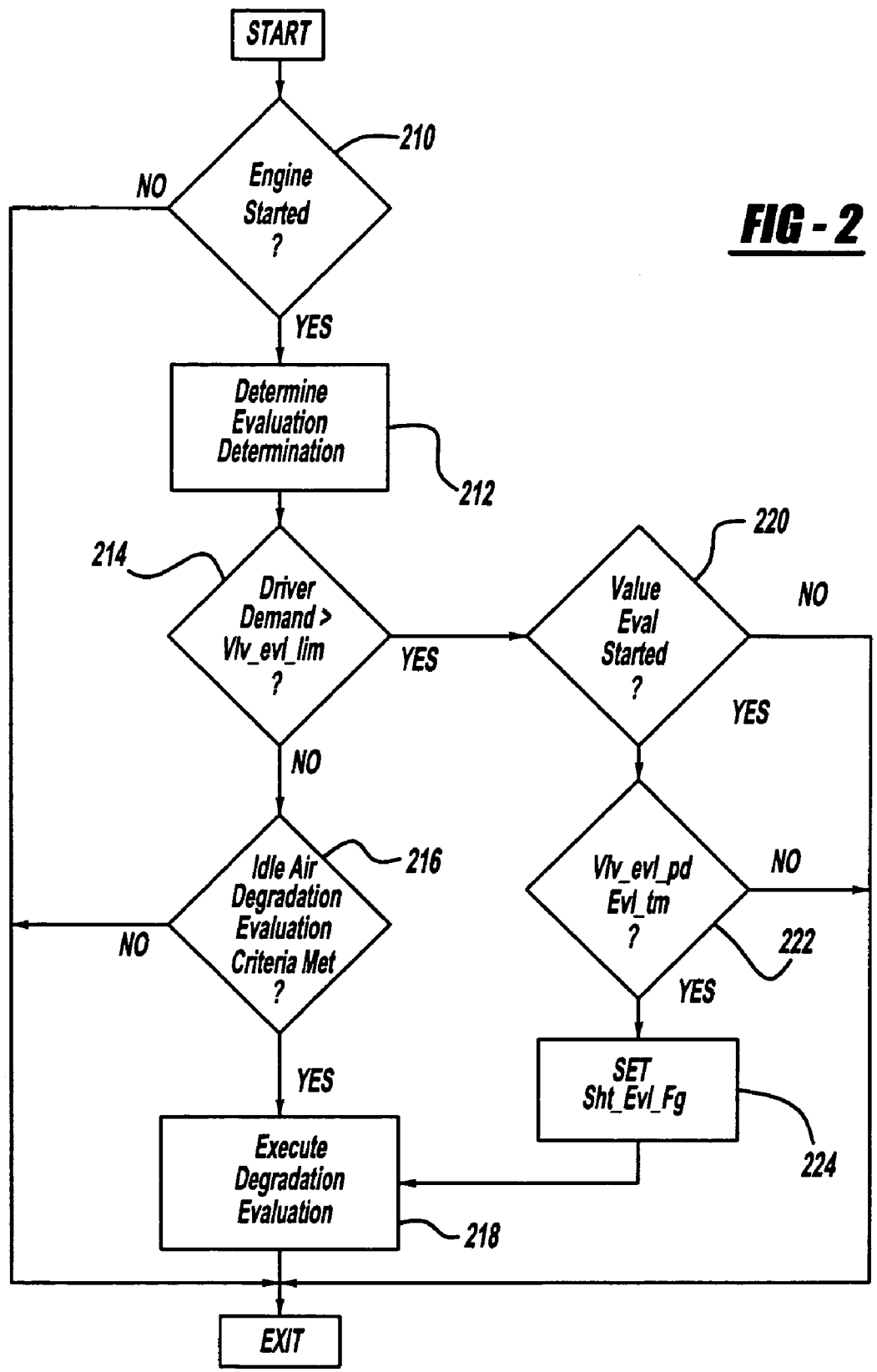
FIG. 2 is a high level flow chart describing conditions when idle air actuator degradation can be determined.

Referring to FIG. 2, a high level flow chart describing conditions for determining degradation of an idle air valve regulation device.

Engine actuators may be operated during certain engine operating conditions with a specific purpose. In one example, the method of operation and the operating results can be used, at least in part, to determine if an actuator is operating with or without degraded performance. Furthermore, the amount of actuator degradation, or lack thereof, may be used to infer or determine operating conditions of other engine components. For example, after cold starting an engine, it may be beneficial to elevate engine speed, increase air flow through the engine, and retard spark ATDC of a combustion stroke in an effort to reduce emissions. By coordinated control of these engine parameters, catalyst temperature may be elevated so that engine emissions are reduced during a start. Therefore, it can be beneficial to determine idle air valve degradation during this period. Specifically, determining idle air valve degradation during this period can increase the evaluation envelope of valve degradation evaluation (i.e., the valve is evaluated at a time when air flow through the valve may be higher than during nominal warm idle conditions) and the amount of valve degradation, or lack thereof, can be considered in determining if an engine and/or catalyst warm-up are warming up as desired.

In step 210, the routine determines if the engine has been started. If the engine is not started the routine proceeds to exit. If the engine has started the routine proceeds to step 212.

In step 212, the starting point and the duration of the valve degradation evaluation is determined. Engine operating conditions are determined, and then the operating conditions are used as indices into tables and/or functions whose output controls the evaluation starting location, Idl_Air_Srt, and duration, Idl_Air_dur, of the evaluation interval. Typically, engine operating conditions that are used to determine the starting point and duration of the evaluation interval can include one or more of the following variables: engine coolant temperature less than a threshold, or within a threshold range, catalyst temperature less than a threshold, or within a threshold range, time since the engine last operated (soak time) less than a threshold, or within a threshold range, desired engine speed less than a threshold, or within a threshold range, and/or starting time of closed-loop fuel control less than a threshold, or within a threshold range. Furthermore, depending on operating conditions, the evaluation interval may be zero to deactivate idle air device degradation evaluation. The routine then proceeds to step 214.

In step 214, driver demand is compared to a predetermined threshold. If driver demand is greater than parameter Vlv_evl_lim the routine proceeds to step 220, if not, the routine continues on to step 216. A driver demand greater than Vlv_evl_μm can have the effect of interrupting an idle air throttling evaluation process.

Driver demand can take different forms based on the engine operating strategy and engine sensor set. For example, for an engine with electromechanically actuated valves or an engine with electronic throttle, driver demand may be based on a desired torque that is interpreted from a pedal position sensor. On the other hand, driver demand for an engine with a mechanically actuated throttle may be based on a signal from a throttle position sensor. Driver demand is evaluated so that degradation of an idle air throttling device may be performed when a sufficient amount of inducted air can be regulated by the idle air throttling valve.

In step 216, engine operating conditions are evaluated to determine if evaluation of idle air valve degradation is desired. Since it is desirable to evaluate idle air valve degradation for the above-mentioned reasons, a variety of engine operating conditions may be queried to determine an appropriate valve degradation evaluation interval. In one example, the valve degradation evaluation interval is based on engine coolant temperature, temperature of a catalyst couple to the engine, and a time since start. However, sub combinations or combinations including additional parameters, such as engine speed, engine load, and air mass flow rate, spark retard, number of combustion events, time since closed loop fuel control, and driver demand are also possible. The following logic statement is one example of a basis for valve degradation evaluation:

---
If(Tmp_lvlv_evl<TEMP<Tmp_hvlv_evl)&
(tm_srt_sm<t_strt
tm_srt_lg)&(cat_lvlv_evl<cat_tmp<cat_hvlv_ev
l) then
vlv_evl=1;

---

In this logic statement Tmp_lvlv_evl is a predefined parameter that may be defined a lower engine coolant temperature limit to activate idle air valve degradation evaluation. The parameter Tmp_hvlv_evl is also predefined and defines a higher engine coolant temperature limit where idle air valve degradation evaluation is allowed. These two parameters are used in the logic statement to define an engine temperature interval where idle air valve degradation evaluation may be performed. The parameter tm_srt_sm is another predefined variable that represents a lower time boundary after an engine start, wherein idle air valve degradation evaluation is permitted. The higher time boundary, after an engine start, where idle air valve degradation evaluation is permitted is determined by the predetermined parameter tm_srt_lg. Time based parameters tm_srt_lg and tm_srt_sm may be constant values or alternatively, they may be further based on engine coolant and/or catalyst temperature. In one example, tm_srt_sm may be increased at lower engine temperatures to promote idle stability during idle air valve evaluation. The parameters cat_lvlv_evl and cat_hvlv_evl represent lower and higher catalyst temperature boundaries for idle air valve degradation evaluation, respectively. The parameter cat_tmp is compared to cat_lvlv_evl and cat_hvlv_evl to determine the portion of the idle air degradation evaluation interval that is based on catalyst temperature. Each set of conditions is combined in a logical "and" statement, from which a determination to evaluate an idle air valve may be made. Of course, logical "or" statements or combinations and sub combinations of "and" and "or" statements are also possible. Any of the before-mentioned operating parameters may be used to determine the evaluation interval by implementing similar logic.

Figure 3:
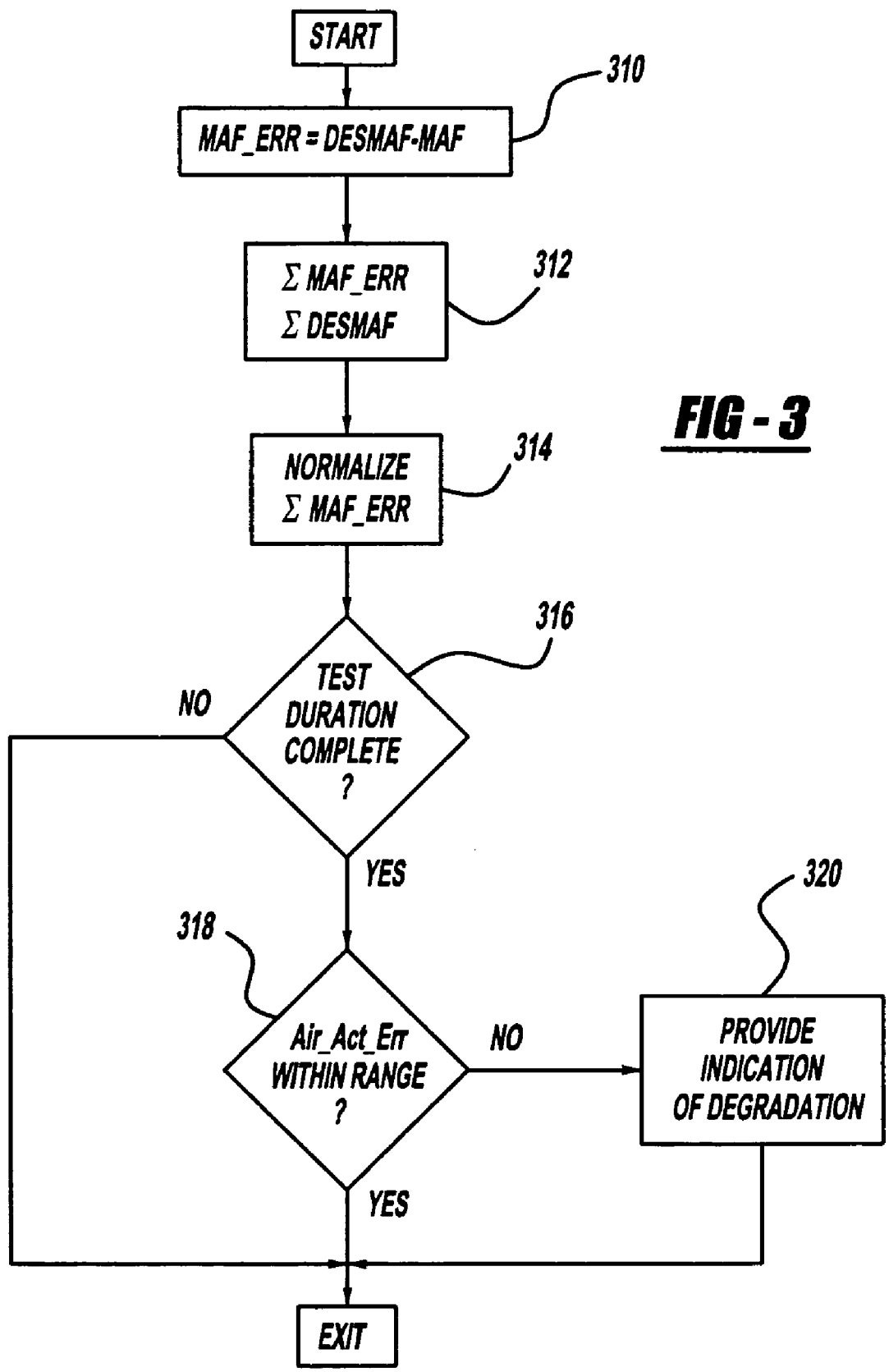
FIG. 3 is a high level flow chart describing a method to determine degradation of an idle air regulation device.

In step 218, degradation of the idle air throttling device is determined. The description of FIG. 3 provides further details of a method to determine degradation of an idle air throttling device. The routine then exits.

In step 220, a determination is made regarding the evaluation of idle air throttling degradation process. If evaluation of an idle air throttling device has commenced, the routine proceeds to step 222. If evaluation has not commenced, the routine proceeds to exit.

In step 222, the duration of an interrupted idle air throttle degradation evaluation, Vlv_evl_pd, is compared to a predetermined value, Evl_tm. If Vlv_evl_pd is greater than Evl_tm then the routine continues to step 224. If Vlv_evl_pd is less than Evl_tm then the routine exits. The parmeter Evl_tm may be a constant or it may be a value that is looked up from a function or table whose output is determined based on another parameter or parameters, such as, engine coolant temperature, catalyst temperature, time since start, time since closed loop fuel control, and/or other engine operating conditions.

In step 224, a variable, Sht_Evl_Fg, is set to indicate that a shortened period of evaluation for assessing idle air throttling degradation may be performed. In other words, if a driver demand interrupts a degradation evaluation, the valve may still be evaluated based on the data collected prior to the interrupt. The routine then proceeds to step 218.

Referring to FIG. 3, a high level flow chart describing a method to determine degradation of an idle air regulation device is shown. As mentioned above, the method may be used with systems that regulate idle air by mechanical throttling, electromechanical valves, or electronic throttles.

In step 310, an amount of error is determined between a desired mass air flow rate into the engine and a determined mass of air inducted into the engine. Desired mass air flow rate, DESMAF, is based on a mass air flow rate that is sufficient to allow the engine to operate at a desired engine speed. Furthermore, DESMAF is adjusted based on barometric pressure, compensating for improved engine efficiency at altitude, and it can also limited by the pressure drop across the idle air device at altitude. For example, for an engine using a mechanical throttle and an auxiliary idle air valve, the desired air amount may be decreased at altitude. In addition, the desired air amount may be limited based on the achievable air mass flow rate and the available pressure drop across the valve (i.e., a fully open valve at sea level may be capable of flowing 1.36 Kg/min while at altitude the same fully open valve may flow 1.13 Kg/min). These factors are accounted for in the final value of DESMAF so that a idle air throttling device may be evaluated at different atmospheric conditions. The mass of air inducted into the engine, MAF, is determined from a signal produced by mass air flow meter 38, or alternatively, from manifold pressure sensor 122. The MAF sensor signal is sampled and processed through a transfer function to determine the inducted mass air flow rate. Alternatively, the MAP transducer signal can be sampled and used in an ideal gas equation to determine mass air flow rate, known to those in the art as a speed/ density calculation. The MAF signal, or alternatively, the MAP signal, is sampled at a preselected rate based on time or engine position during the degradation evaluation. The determined mass of air inducted into the engine is subtracted from the desired mass air flow rate that is provided by an idle air throttling device to determine mass air flow rate error, MAF_ERR. The equation is as follows:

$$MAF\_ERR = DESMAF - MAF$$

An error amount is determined for each above-mentioned signal sample. After the mass air flow error is determined, the routine proceeds to step 312.

In step 312, a summation of error amounts, MAF_ERR, and a summation of desired air amounts, DESMAF, is determined. The sum of individual error amounts and desired air amounts over the evaluation interval can improve the determination of a degraded idle air throttling valve.

During cold start conditions sensor signals can have increased variation. Specifically, when a cold engine is operated with retarded spark and a lean air-fuel ratio, combustion pressure can vary. This may produce an increase in the variation of a signal used to determine air mass inducted into an engine. The summation of MAF_ERR and DESMAF, over the evaluation interval, tends to filter the variables, thereby improving determination of valve degradation by reducing the effect of signal variation. The routine then continues on to step 314.

In step 314, the summation of mass air flow error is normalized. During engine warm-up the desired mass of air inducted into the engine may change due to engine temperature, transmission load, and/or catalyst temperature. For example, after starting an engine at 22° C. it may be desirable to increase the desired engine air amount by 50% over the warm idle air amount so that the time to heat a catalyst may be reduced. However, when starting the engine at 35° C. it may be desirable to increase the desired engine air amount by 10% over the warm idle air amount so that the catalyst can be heated, but with less fuel consumed. These different engine operating conditions may lead to a large difference between MAF_ERR summations between different idle air throttling valve degradation evaluations. This may make it difficult to differentiate a degraded valve from a non-degraded valve. Therefore, the inventors herein have developed a method to normalize valve degradation during a variety of operating conditions. By normalizing the error term, MAF_ERR, the influence of variable operating conditions can be reduced. Normalization is accomplished by the following equation:

$$Air\_Act\_Err = \frac{\sum MAF\_ERR}{\sum DESMAF}$$

This equation is applied to both positive and negative error conditions, i.e., the idle air throttling valve flows more or less than the desired amount. The routine then moves to step 316.

In step 316, the duration of the current idle air throttling evaluation is compared to the valued determined in step 212 of FIG. 2, Idl_Air_dur. If the duration of the evaluation meets or exceeds Idl_Air_dur the routine proceeds to step 318, if not, the routine moves to exit.

Continuing with step 316, the flag Sht_Evl_Fg from step 224 of FIG. 2 is also checked. If a shortened evaluation period is desired due to driver demand, the shortened evaluation duration is compared to a predetermined amount, Sht_Evl_dur. If the current evaluation period is less than Sht_Evl_dur the degradation evaluation is aborted until the next engine start. Alternatively, the routine may be executed again during a subsequent idle period provided evaluation conditions are met.

In step 318, an assessment of the normalized error is made. As described above, valve degradation may be indicated for more or less air mass than a desired air mass amount. In one example, less idle air mass may result in a normalized error amount of 0.3. In another example, additional idle air mass may result in a normalized error amount of −0.35. In one embodiment, the absolute value of the normalized error amount, |Air_Act_Err|, may be compared to a predetermined amount or it may be compared to a variable amount that is based on engine operating conditions (e.g., an acceptable normalized error amount may vary from 0.3 to 0.05 based on engine coolant temperature). In another embodiment, the positive or negative error amount, Air_Act_Err, may be compared to a variable amount that is determined by the sign of Air_Act_Err (e.g., 0.2 for a positive sign and −0.15 for a negative sign), or by the sign of Air_Act_Err and engine operating conditions. If an error amount is out of range, (i.e., less or more than a determined amount), the routine proceeds to step 320. If the error amount is within range, the valve is determined to be operating with an acceptable amount of degradation and the routine proceeds to exit.

In step 320, an indication of valve degradation is provided to the driver. Depending on the method used to determine valve degradation determination in step 318, different indications of idle air valve degradation are possible. For example, if a sign of Air_Act_Err is maintained throughout the calculations, a user readable software variable can indicate a higher or lower air mass than desired. In addition, an indication of valve degradation may be made by illuminating a light on the instrument panel or by transmitting a signal to a remote destination. Furthermore, it is possible to delay driver notification of a degraded idle air valve until two or more evaluations identifying out of range degradation, thereby reducing possibility of erroneous degradation indications. The routine then exits.

Figure 4:
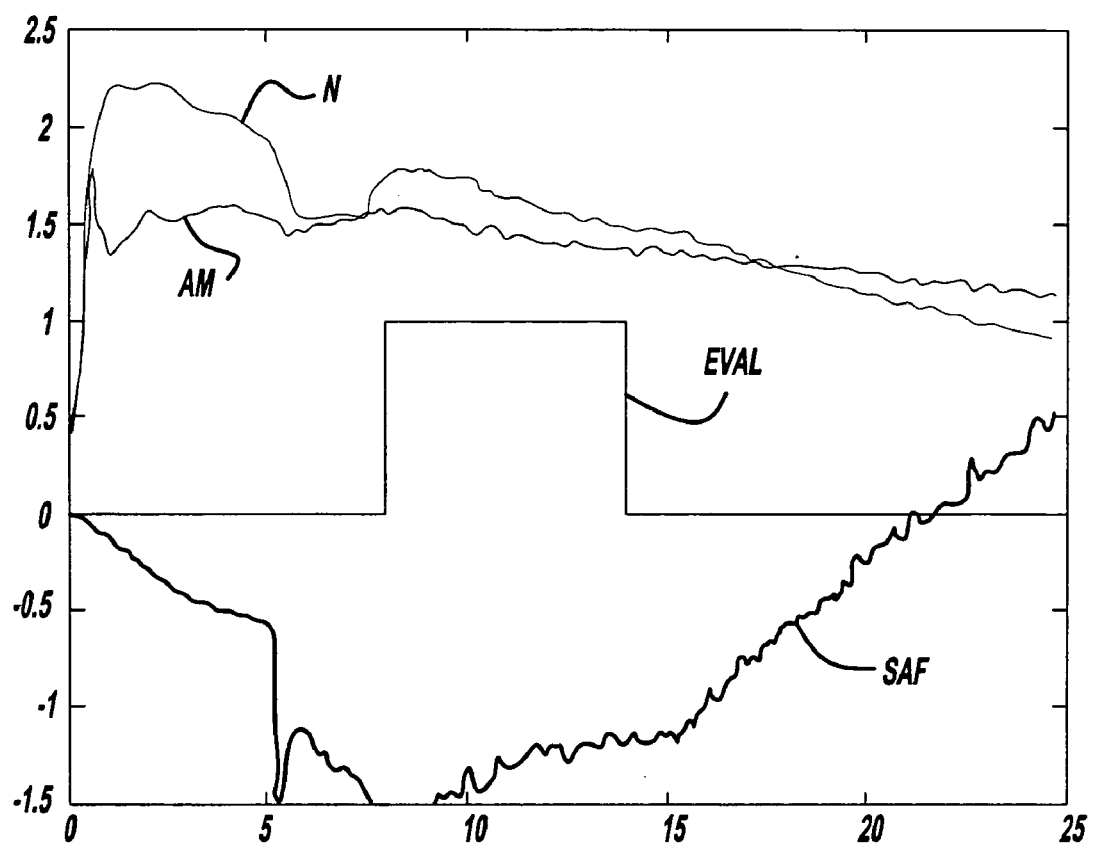
FIG. 4 is a plot of several signals of interest when determining degradation of an idle air throttling device of an internal combustion engine.

Referring to FIG. 4, a plot shows several normalized signals that may be of interest when determining degradation of an idle air throttling device of an internal combustion engine. Specifically, engine speed (N), spark timing (SAF), air mass flow rate (AM), and the idle air device evaluation interval (EVAL) are shown during a cold start. These signals represent one possible engine starting condition where elevated engine speed, air mass flow, and retarded spark are used to increase catalyst temperature. The elevated engine speed increases the number of exhaust events delivered to the catalyst while the retarded spark increases exhaust temperature by delaying heat release of the combusted air-fuel mixture.

The evaluation interval begins in this example at approximately 8 seconds and lasts for a period of 6 seconds. As described above, this interval may moved and the duration may be changed with respect to the starting time, catalyst temperature, engine coolant temperature, engine speed, time since closed loop fuel control, engine load, and/or air mass flow rate. In this example, the evaluation interval corresponds with a spark angle that is retarded ATDC (compression), an elevated engine speed, and an elevated air mass flow rate. Although these conditions can facilitate early catalyst heating, and they may also provide better conditions for degradation assessment, they are not necessary to initiate an idle air throttling device degradation evaluation. An idle air degradation evaluation may be conducted dependant on or independent of these conditions.

Figure 5:
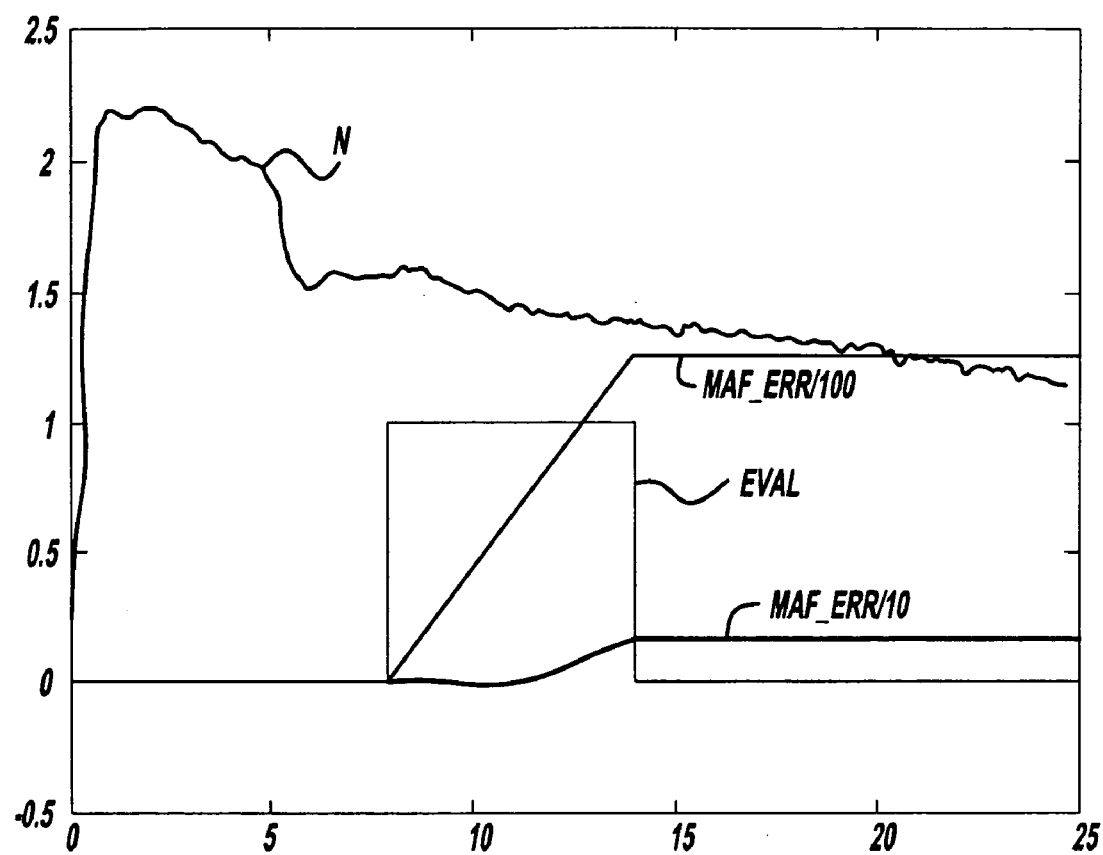
FIG. 5 is a plot of signals used to determine idle air throttling device degradation.

Referring to FIG. 5, a plot shows signals that have been normalized, and that may be used to determine degradation of an idle air throttling device. In this example, an auxiliary idle air valve in parallel with a primary mechanical throttle is evaluated. A representative valve is compared against a valve that has been purposefully limited to simulate a degraded condition. The test conditions are similar and the evaluations began and ended at the same locations. The MAF_ERR/100 signal is the summation of the MAF_ERR term for the purposefully limited valve. The MAF_ERR/10 is the summation of the MAF_ERR term for the representative valve. Notice, by the end of the evaluation interval the MAF_ERR/100 is greater than the MAF_ERR/10 signal. In fact, without dividing the MAF_ERR by an additional factor of ten, the difference in the signals would be even more pronounced. This signal separation between degraded and nominal valve MAF_ERR summations permits the determination of valve degradation.

Continuing with FIG. 5, this plot shows signals that are representative of a condition wherein air flow through the idle air valve is less than desired. An air flow error in the opposite direction, i.e., a grater air flow than desired, would indicate negative values of MAF_ERR during the evaluation interval. In this way, the method described above can evaluate air flows that are greater or less than desired, during the engine and catalyst warm-up period.

Figure 6:
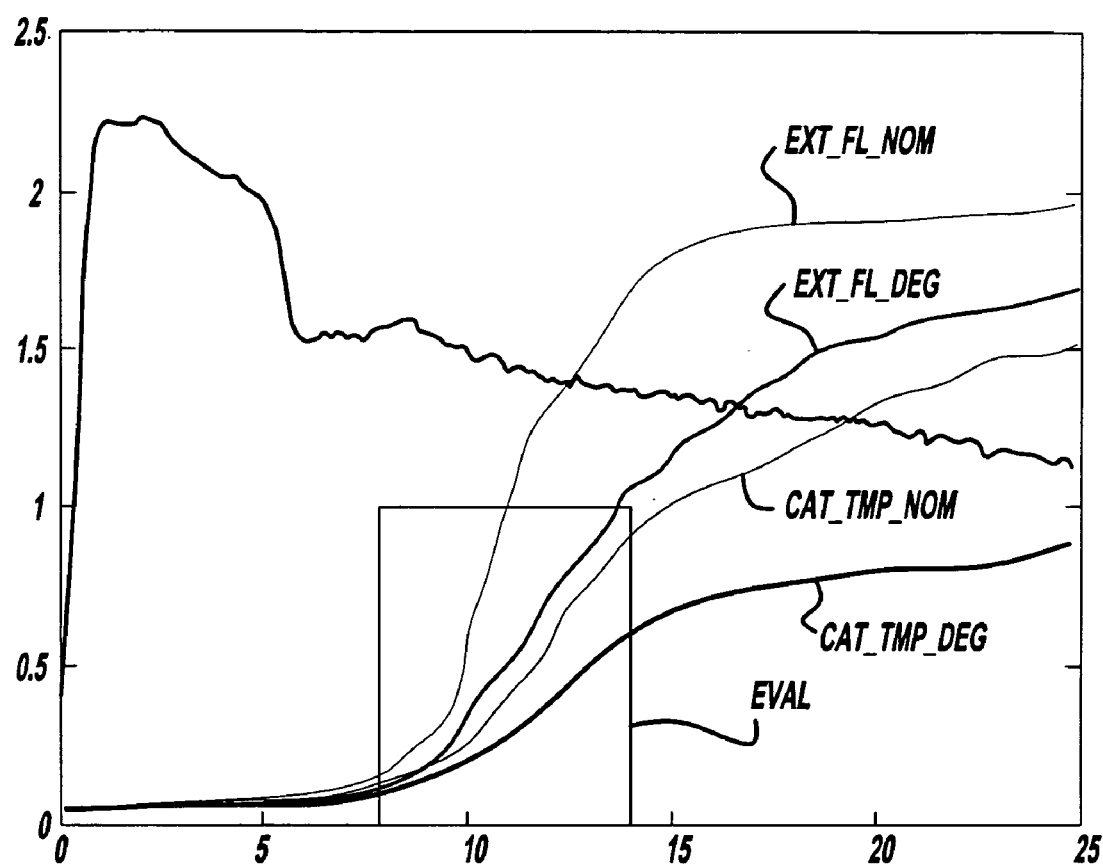
FIG. 6 is a plot of normalized representative exhaust temperatures during a start and degradation evaluation.

Referring to FIG. 6, a plot shows normalized signals that are representative of engine exhaust and catalyst temperatures during a start. Again, conditions for a nominal flow valve and a degraded flow valve are illustrated. The signal EXT_FL_NOM represents exhaust gas temperature at the exhaust flange of an engine with a nominal valve. In contrast, the signal EXT_FL_DEG represents exhaust gas temperature at the exhaust flange of an engine with a purposefully restricted idle air valve. Notice, the difference in the exhaust flange temperatures, this difference becomes more pronounced during the period of evaluation where the control strategy attempts to heat the catalyst. Furthermore, since the heat delivered to the exhaust flange is lower with the restricted valve, the catalyst temperature is correspondingly lower too. The signals labeled CAT_TMP_NOM and CAT_TMP_DEG represent catalyst temperatures with a nominal idle air valve and a degraded idle air valve respectively. Again, the EVAL signal indicates the interval when valve degradation is determined.

This plot illustrates an effect that a degraded idle air valve can have on catalyst warming. Based on this effect, a numerical value corresponding to valve degradation may be used to provide a better inference of catalyst efficiency during warm-up. For example, a nominal idle air valve may indicate a degradation factor of 0.1, while a degraded valve may indicate a degradation factor of 0.65. The difference in the degradation factors coupled with empirical data may permit a strategy to predict a difference in catalyst efficiency.

As will be appreciated by one of ordinary skill in the art, the routines described in FIGS. 2 and 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the invention. For example, I3, I4, I5, V6, V8, V10, and V12 engines operating in natural gas, gasoline, or alternative fuel configurations could use the present invention to advantage.

We claim:

1. A method for determining degraded performance of an idle air amount throttling valve used to control an engine air amount inducted into an internal combustion engine, the method comprising:
   operating said idle air amount throttling valve to provide a inducted engine air amount; and
   determining degradation of said idle air amount throttling valve based on a comparison of said inducted engine air amount and a determined inducted engine air amount, said degradation determination performed at least when temperature is less than a threshold value.

2. The method of claim 1 wherein said comparison determines an error between said inducted engine air amount and said determined inducted engine air amount, where said inducted engine air amount is a target amount.

3. The method of claim 2 wherein said inducted engine air amount is a summation of target inducted engine air amounts over an interval, said determined inducted engine air amount is a summation of determined inducted engine air amounts over said interval, and wherein said error is a summation of error amounts determined from said summation of target inducted engine air amounts and said summation of determined inducted engine air amounts.

4. The method of claim 3 wherein said summation of error amounts is divided by said summation of target inducted engine air amounts to produce a normalized idle air degradation factor.

5. The method of claim 1 wherein said idle air amount throttling valve is an electronic throttle.

6. The method of claim 1 wherein said idle air amount throttling valve is at least an electromechanical intake valve.

7. The method of claim 1 wherein said idle air amount throttling valve is an auxiliary valve, connected in parallel to a main throttle.

8. The method of claim 1 wherein said a temperature includes an engine temperature.

9. The method of claim 1 wherein said degradation determination is performed further based on engine speed.

10. The method of claim 1 wherein said degradation determination is performed further based on a demand of an operator.

11. The method of claim 1 wherein said determined inducted air amount is based on a signal from an air flow meter.

12. The method of claim 1 wherein said determined inducted air amount is based on a signal from a pressure sensor.

13. The method of claim 1 wherein said degradation determination is performed based further on a spark amount that is retarded after top-dead-center of a combustion stroke.

14. The method of claim 1 wherein said degradation determination is performed based further on a temperature of a catalyst located in an exhaust system coupled to said engine.

15. A method for determining degraded performance of an idle air amount throttling valve used to control an engine air amount inducted into an internal combustion engine, the method comprising:

operating said idle air amount throttling valve based on a target inducted engine air amount; and indicating degradation of said idle air amount throttling valve based on an evaluation, said evaluation comparing a determined inducted engine air amount and said target inducted engine air amount, said evaluation performed at least when catalyst temperature is less than a threshold value.

16. The method of claim 15 wherein said indicating degradation of said idle air amount produces an operator identifiable signal indicative of degradation of said idle air amount throttling device.

17. The method of claim 15 wherein said idle air amount throttling valve is an electronic throttle.

18. The method of claim 15 wherein said idle air amount throttling valve is an auxiliary valve, connected in parallel to a main throttle.

19. A method for determining degraded performance of an auxiliary idle air amount throttling valve used to control an air amount inducted into an internal combustion engine, said internal combustion engine having a main throttling device connected in parallel with the auxiliary idle air amount throttling device, the method comprising:

determining a temperature of a catalyst located in an exhaust system, said catalyst in communication with exhaust gases from said internal combustion engine;

determining an amount of air inducted into said internal combustion engine; and determining said auxiliary idle air amount throttling valve is degraded when said determined air amount is less than a target amount of air by a predetermined amount, said degradation determination performed at least when spark is retarded after top-dead-center of a combustion stroke.

20. A method for determining degraded performance of an idle air amount throttling valve used to control an air amount inducted into an internal combustion engine, the method comprising:

controlling said internal combustion engine in a first operating mode, said first mode producing at least a torque amount based at least on an operator demand;

controlling said internal combustion engine in a second operating mode, said second mode producing at least an exhaust energy amount based at least on a temperature of a catalyst;

commanding a target amount of air to be inducted into an internal combustion engine by controlling a valve position of said idle air amount throttling valve, based on said first or said second engine mode;

determining an amount of air inducted into said internal combustion engine; and determining the performance of said idle air amount throttling valve is degraded when said determined air amount is less than or greater than said target amount of air by a predetermined amount, during said second engine operating mode.

21. A system for determining degraded performance of an idle air amount throttling valve used to control an engine air amount inducted into an internal combustion engine, the system comprising:

a sensor for determining air flow into an engine;

an idle air amount throttling valve for regulating air flow into an engine; and a processor for operating said idle air amount throttling valve based on a target inducted engine air amount, and for determining degradation of said idle air amount throttling valve based on a comparison of said target inducted engine air amount and a determined inducted engine air amount based on an output of said sensor, said comparison indicating that less flow than said target is being obtained, said degradation determination performed at least when temperature is less than a threshold value.

22. A computer readable storage medium having stored data representing instructions executable by a computer to control an internal combustion engine of a vehicle, said storage medium comprising:

instructions for operating said idle air amount throttling valve based on a target inducted engine air amount; and instructions for determining degradation of said idle air amount throttling valve based on a comparison of said target inducted engine air amount and a determined inducted engine air amount, said degradation determination performed at least when temperature is less than a threshold value.

* * * * *